United States Patent [19]

McFarland et al.

[11] 4,003,639
[45] Jan. 18, 1977

[54] CATOPTRIC LENS ARRANGEMENT

[75] Inventors: Philip J. McFarland, Lynnfield;
Werner R. Rambauske, Carlisle,
both of Mass.

[73] Assignee: Raytheon Company, Lexington,
Mass.

[22] Filed: July 3, 1975

[21] Appl. No.: 592,832

Related U.S. Application Data

[63] Continuation-in-part of Ser. No. 268,270, July 3, 1972, abandoned.

[52] U.S. Cl. ............................... 350/294; 350/293
[51] Int. Cl.² .......................................... G02B 5/10
[58] Field of Search .......... 350/294, 293, 295, 296, 350/299, 288, 199, 21, 27; 240/41.35 C; 219/349

[56] References Cited

UNITED STATES PATENTS 3,790,258    2/1974    Rambauske ....................... 350/294

*Primary Examiner*—John K. Corbin
*Assistant Examiner*—Jon W. Henry
*Attorney, Agent, or Firm*—Philip J. McFarland; Joseph D. Pannone

[57] ABSTRACT

Catoptric lens arrangements for combining energy from a number of sources, as optical energy from a number of lasers, are shown. The disclosed arrangements include sets of mirrors with reflecting surfaces sharing focal points spaced from a common axis. The mirrors in each one of the sets are disposed on a common mount in such a manner that aperture blockage is completely eliminated.

3 Claims, 7 Drawing Figures

CATOPTRIC LENS ARRANGEMENT

CROSS-REFERENCE TO RELATED APPLICATION

This is a continuation-in-part of application Ser. No. 268,270 filed July 3, 1972 now abandoned.

BACKGROUND OF THE INVENTION

This invention pertains generally to catoptric lens arrangements and particularly to such types of arrangements having lens elements with focal points spaced from the lens axis.

It is now known in the art that so-called "confocal" catoptric lens arrangements, i.e. arrangements incorporating reflecting surfaces corresponding to the curved surface generated by nutating selected quadratic conic sections about a lens axis, combine many desirable qualities. Reflecting surfaces so generated characteristically possess image points on a circle, or an arc of a circle, centered on an axis rather than a single point as in the usual case. Thus, by judiciously selecting particular conic sections for the generatrices of the reflecting surfaces of the elements of a catoptric lens arrangement, it is possible to design such an arrangement to be diffraction-limited with an extremely large aperture. It follows, then, that the f-number of such a lens arrangement may be far less than 1. Such a characteristic, in turn, means that radiant energy from a point source may, if desired, be focused within a very small circle of confusion; as a matter of fact, focusing may take place within a circle of confusion with a diameter in the same order as the wavelength of radiant energy. Alternatively, if desired, an almost perfectly collimated beam of radiant energy may be formed from radiant energy from a point source, because the diffraction effects suffered by such a catoptric lens arrangement are very small.

It is evident that confocal catoptric lens arrangements are particularly well suited for applications in which conventional refractive lens arrangements are, for one reason or another, not satisfactory. For example, when the radiant energy to be focused or collimated is concentrated in an intense beam, as in the beam from a high-powered laser, a sufficient amount of such energy incident on a refractive lens arrangement is absorbed by the material from which the lens elements are fabricated (some type of glass, mica or other solid material ordinarily deemed to be totally transparent) thereby causing undue heating which distorts, or even destroys, the lens elements.

Although a catoptric lens arrangement is not as susceptible to damage from overheating because energy passing through such an arrangement is almost completely reflected by the mirror surfaces of the lens elements, there is, however, a slight amount of energy absorbed by each lens element to cause heating. Therefore, especially when it is necessary to combine beams from more than a single high powered laser, even catoptric lens arrangements may be unduly heated. There simply is no known way of making the reflecting surface of lens elements in a catoptric lens arrangement to provide reflecting surfaces which are certain to withstand the enormous concentrations of energy resulting from the use of several high power lasers. Further, with any catoptric lens arrangement not using confocality principles, appreciable aperture blockage must be tolerated in order to arrange the lens elements in proper relative position with respect to each other.

It has been proposed to carry out thermal nuclear fusion by combining the beams from a number of high powered lasers in such a manner that the energy in each beam is focused on a small target. It is possible in such a system to obtain a flux density at the target which is sufficiently high to initiate the fusion reaction. That is, a flux density in the order of $10^{14}$ to $10^{16}$ watts per square centimeter may be attained. When energy with a flux density of such intensity is attained, a concomitant light pressure (in the order of the pressure required to contain the expanding plasma resulting from a nuclear reaction) is generated. Obviously, however, successful containment of an expanding plasma from a real specimen undergoing fusion requires that the light pressure be applied over a continuous finite area. In other words, any lens arrangement suited to the purpose must be capable of forming an "optical bottle."

In the design of optical radars it would be highly desirable to combine beams from several lasers into a composite beam, thereby to increase the effective range of the system. Again, in such an application conventional lens arrangements are inadequate for the basic reason that it is almost impossible to collimate energy from more than one source into a single beam. Using conventional lens elements, which have their focal points on a lens axis, in practice only one laser beam may be collimated by any particular known lens arrangement.

SUMMARY OF THE INVENTION

Therefore, it is a primary object of this invention to provide an improved catoptric lens arrangement for combining optical energy from different sources into a composite beam, such arrangement being characterized by the absence of aperture blockage.

Another object of this invention is to provide an improved catoptric lens arrangement for combining optical energy from a number of sources, such arrangement being characterized by the use of a number of cooperating sets of lens elements, each having a relatively small aperture.

In an improved embodiment of this invention these and other objects are attained generally by providing sets of confocal catoptric lens arrangements, each set including: (a) a primary, or entrance, lens element having a convex reflecting surface which corresponds to a part of a ogive; and (b) a secondary, or exit mirror, with a convex reflecting surface, such surface corresponding to a portion of a generally ellipsoidal reflecting surface confocal to the entrance lens element to focus the optical energy from all sets at a single focal point. The lens elements in each set are disposed on a common mount so that no structure, other than the reflecting surfaces of the mirrors, is in the path of the optical energy passing through each set. In an alternative embodiment, the sets of catoptric lens arrangements are arranged so as to form, in combination with a single convex hyperboidal mirror, a composite beam having a common virtual origin.

DESCRIPTION OF THE PREFERRED EMBODIMENTS

Figure 1:
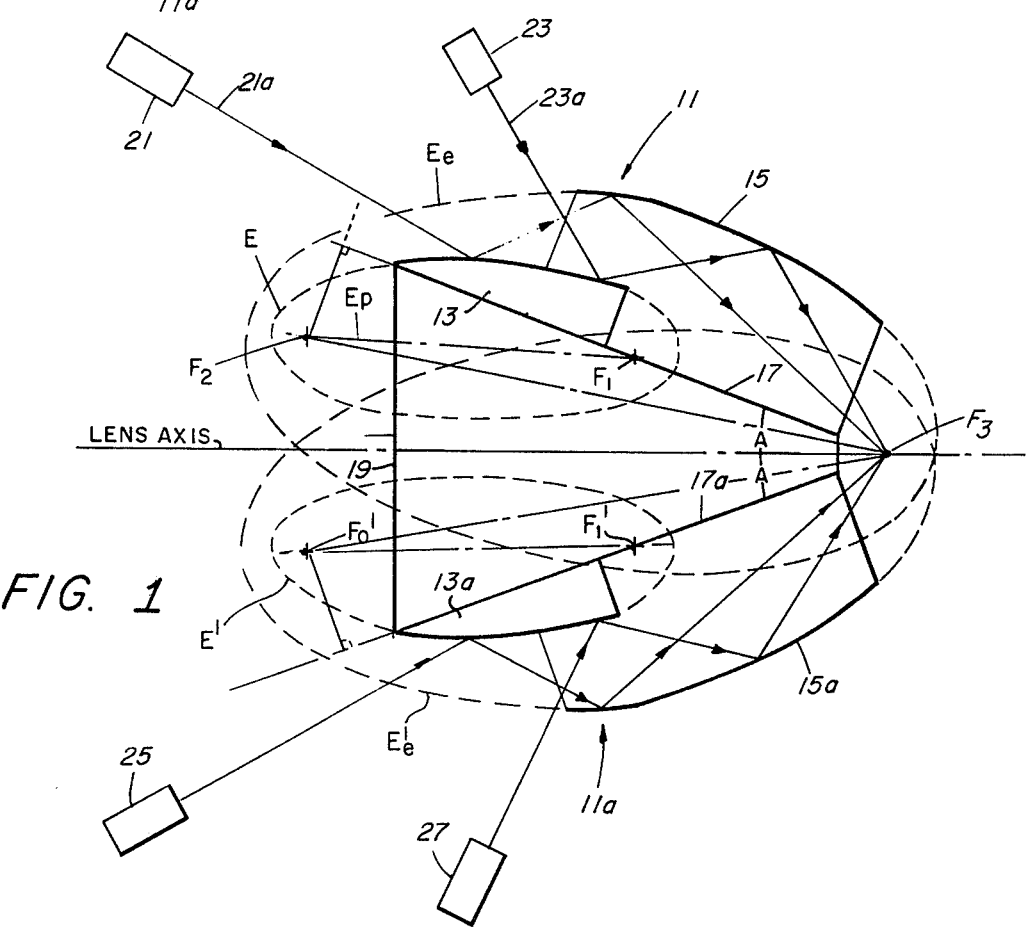
FIG. 1 is a simplified meridional view of two sets of catoptric lens arrangements according to this invention illustrating how beams from a number of lasers may be focused to a common focal point.

Referring now to FIG. 1, it may be seen that a catoptric lens arrangement according to this invention may consist of a complementary pair of confocal lens arrangements 11, 11a. Each one of such arrangements is, in this embodiment, tipped at an angle A to a lens axis so that the two share a common focal point, $F_3$, on such axis. Each one of the catoptric lens arrangements 11, 11a includes, respectively, an entrance mirror 13, 13a and an exit mirror 15, 15a. The generatrix of the reflecting surface (not numbered) of the entrance mirror 13 may be deemed to be an ellipse E, the focal points of such ellipse being at points $F_o$ and $F_1$ and the principal axis $E_P$ of such ellipse being nutated about a line 17. It will be evident, therefore, that, if the principal axis $E_P$ of the ellipse E is nutated completely around the line 17, the focal point $F_o$ will describe a circle in a plane orthogonal to such line. It will also be evident that, if the principal axis $E_P$ of the ellipse E is nutated partly around the line 17, the focal point $F_o$ will describe an arc of such circle. Further, as shown here, a portion of the ellipse E (that portion shown in heavy solid line) will describe a corresponding portion of an ogive having its longitudinal axis coincident with line 17. Thus, if the principal axis $E_P$ of the ellipse E is nutated through 180° about line 17 to describe the reflecting surface of the entrance mirror B, that surface will be one-half of an ogive and the focal point $F_o$ will lie on the semicircle indicated by the solid line perpendicular to the line 17. It follows that the reflecting surface of the entrance mirror 13 is convex and parellipsoidal (meaning resembling an ellipsoid) with one focal point $F_o$ on a semicircle. The generatrix of the reflecting surface (not numbered) of the exit mirror 15 may be deemed to be an ellipse $E_e$ having one of its focal points $F_2$ coincident with the focal point $F_o$ of the ellipse E and the second of its focal points $F_3$ on the lens axis, the principal axis $E_{ep}$ of such ellipse being nutated around the line 17 so that the focal point $F_3$ is held on the lens axis and the focal point $F_2$ describes an arc coincident with the arc of the focal circle $F_o$. Thus, the concave reflecting surface (which is parellipsoidal) of the exit mirror 15 is "confocal" with the convex reflecting surface of the entrance mirror 13, meaning that the focal arcs $F_o$, $F_2$ are coincident.

The line 17 here is coincident with one optically flat surface (not numbered) of a wedge 19. The flap portions of the entrance mirror 13 and the exit mirror 15 obviously then are mounted on such surface and affixed thereto in any convenient manner to achieve the desired confocality.

It may be seen now that, if optical energy is directed toward the focal point $F_1$ to illuminate any portion of the reflecting surface of the entrance mirror 13, such energy will be directed through the catoptric lens arrangement 11 to the focal point $F_3$. Thus, for example, optical energy from a laser 21 (such energy being represented by the ray 21a) located in any convenient position may be directed toward focal point $F_1$ to illuminate a portion of the entrance mirror 13. In passing, it will be noted that any focusing arrangement may be used to direct the normally slightly divergent beam from the laser 21 toward the focal point $F_1$. For example, any one of the arrangements shown in the U.S. application Ser. No. 244,393 entitled "Catoptric Lens Arrangement" of Werner R. Rambauske (which application is assigned to the same assignee as this application and now is U.S. Pat. No. 3,982,824 issued Sept. 28, 1976 may be used. After reflection by the reflecting surface of such mirror, the virtual source of the optical energy from the laser 21 is a point on the focal arc $F_o$. This means that such optical energy, after reflection from the reflecting surface of the entrance mirror 13, will appear to have originated at a point on the focal arc $F_2$ of the reflecting surface of the exit mirror 15. Obviously, then, after reflection from the reflecting surface of the exit mirror 15 the optical energy from laser 21 is focused at focal point $F_3$. The same situation obtains with optical energy from a laser 23 having a beam 23a which is directed toward the focal point $F_1$, or for that matter with any beam from any source, provided only that such beam is focused toward the focal point $F_1$ and illuminates the reflecting surface of the entrance mirror 13. In other words, optical energy from a number of sources may be focused through catoptric lens arrangement 11 at the focal point $F_3$. After passing the focal point $F_3$, then, optical energy from a number of sources may be collimated or focused at another point by conventional lens elements (not shown in FIG. 1).

The catoptric lens arrangement 11a is mounted on an optically flat surface of the wedge 19 which includes the line 17a. The entrance mirror 13a and the exit mirror 15a preferably are similar to the corresponding mirrors of the catoptric lens arrangement 11 except that the generatrix of the entrance mirror 13a and the exit mirror 15a is, respectively, ellipse E' and $E'_e$. The catoptric lens arrangement 11a then focuses energy from a second set of lasers 25, 27 at the focal point $F_3$.

It will now be seen that the lens elements of each one of the catoptric lens arrangements 11, 11a are supported with respect to one another so that no supporting structure is in the path of any optical energy to be finally focused at the focal point $F_3$. It will also be seen that there is no requirement that the lines 17, 17a be coplanar with each other or with the lens axis. That is, so long as each catoptric lens arrangement shares the focal point F, optical energy from a number of sources may be combined. As a matter of fact, the wedge 19 could be formed as a torus (or a part of a torus) with $F_3$ as its center. Many additional catoptric lens arrangements could then focus at $F_3$. Alternatively a plurality of the illustrated catoptric lens arrangements could be disposed on the same surface of the wedge 19.

Figure 2:
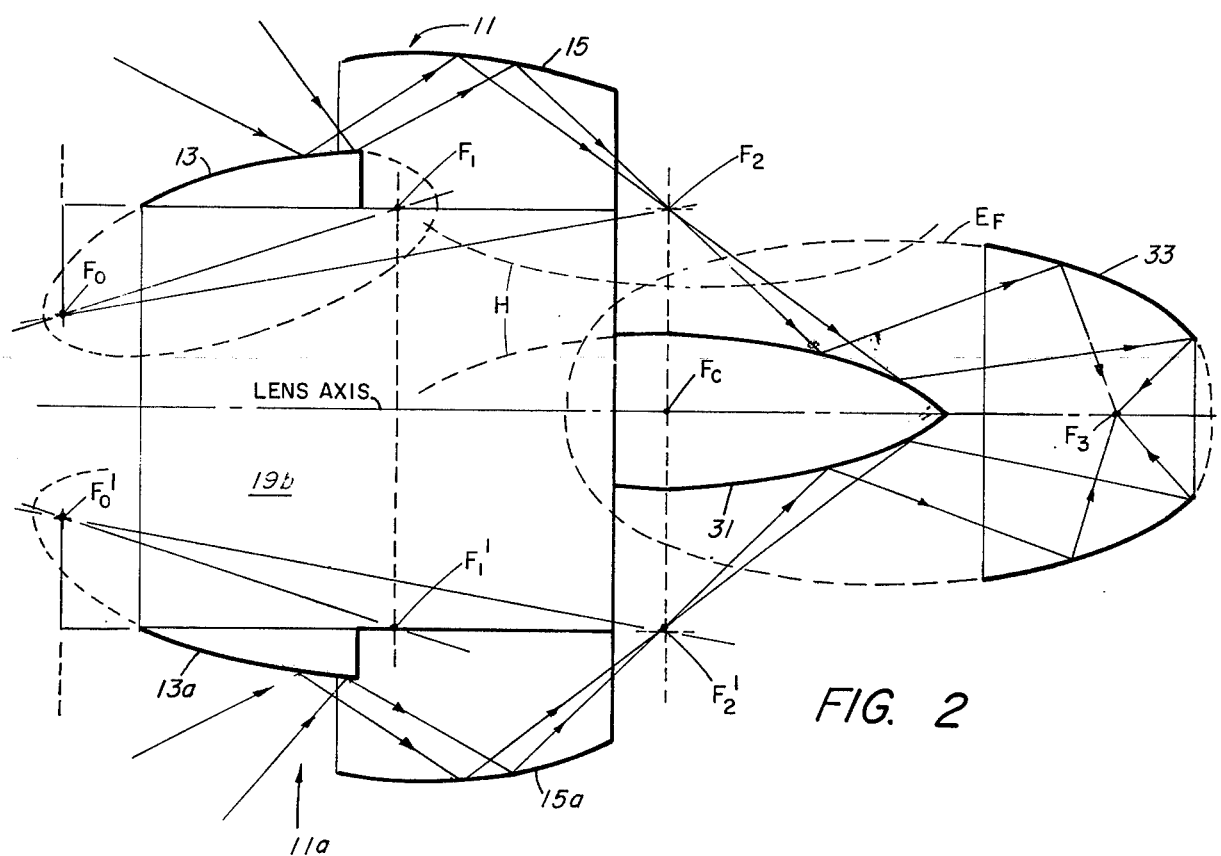
FIG. 2 is a simplified meridional view of an alternative embodiment of this invention.

Referring now to FIG. 2 it may be seen that the catoptric lens arrangements 11, 11a may be mounted on optically flat surfaces (not numbered) of a block 19b, such surfaces being parallel to the lens axis rather than inclined as shown in FIG. 1. In an embodiment of this type the optical energy out of the exit mirrors 15, 15a is focused respectively at focal points $F_2$ and $F'_2$ which are equally spaced from the lens axis. After passing through the focal point $F_2$, $F'_2$, the energy is in two diverging beams as shown. In order that the energy finally be focused at a focal point $F_3$ it is necessary to combine the diverging beams from the focal points $F_2$, $F'_2$. Such combination is here effected by a hyperboloidal mirror 31 (affixed to the block 19b) in combination with an ellipsoidal mirror 33. The reflecting surface of the hyperboloidal mirror 31 is generated by rotating a portion (not numbered, but shown in heavy line) of one branch of a hyperbola H about the lens axis. One focal point of the hyperbola H is at focal point $F_2$ and the second focal point of the hyperbola H is at $F_c$, on the lens axis. The reflecting surface of the ellipsoidal mirror 33 is generated by rotating a portion (not numbered, but shown in heavy line) of an ellipse $E_f$ about the lens axis. One focal point of the ellipse $E_f$ is at the focal point $F_c$ and the second focal point of the ellipse $E_f$ is at the focal point $F_3$. The diverging beam from focal point $F_2$, after reflection from the reflecting surface of the hyperooidal mirror 31, appears to have originated at focal point $F_c$. Similarly, the diverging beam from focal point $F'_2$ is changed to a beam with a virtual origin at focal point $F_c$. It follows then that all of the optical energy will be focused at focal point $F_3$.

It will now be observed that, as was the case with the embodiment shown in FIG. 1, the block 19b could be made into a torus to allow more than two catoptric lens arrangements 11, 11a to be used to focus optical energy at focal point $F_3$.

Figure 3C:
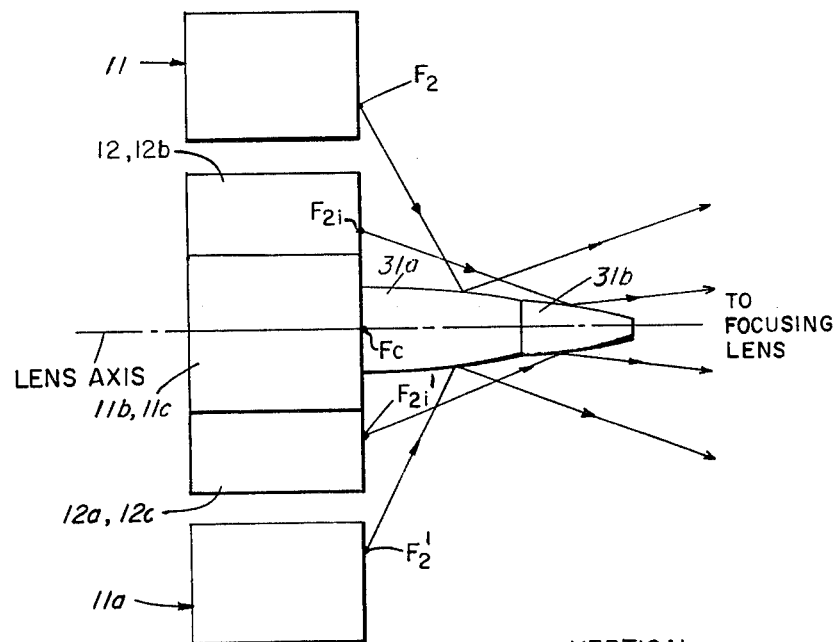
FIGS. 3A, 3B and 3C taken together are simplified sketches of a manner in which sets of catoptric lens arrangements may be mounted to form a single composite beam out of the beams from a number of different sources.
Figure 3A:
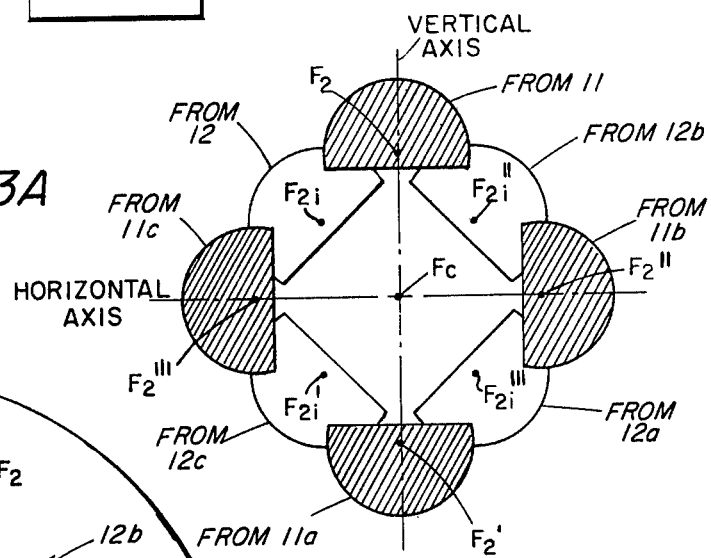
Figure 3B:
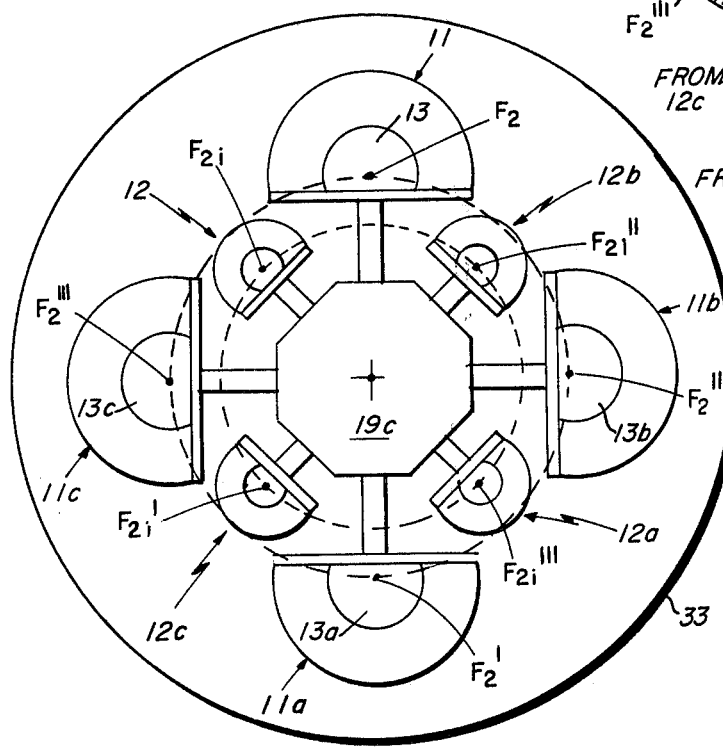

While the catoptric lens arrangements shown in FIGS. 1 and 2 operate to focus optical energy from many sources to a desired focal point, the flux density of such energy in a plane orthogonal to the lens axis near the desired focal point varies from zero to a maximum. That is, as represented in FIG. 3A, optical energy from each catoptric lens arrangement is in a separate beam, as indicated for example by the shaded sectors. If it is required that optical energy approach the focal point $F_3$ so that such energy be distributed completely around the lens axis, an arrangement such as is illustrated in FIGS. 3B and 3C may be used. Thus, for example, as shown most clearly in FIG. 3B, a first set of four catoptric lens arrangements 11, 11a, 11b, 11c (each similar to those shown in FIG. 2) may be mounted on a block 19c so that the focal points $F_2$, $F'_2$, and $F''_2$ and $F'''_2$ of the entrance mirrors 13, 13a, 13b, 13c lie at 90° intervals along the periphery of a circle around the lens axis. A second set of four catoptric lens arrangements 12, 12a, 12b, 12c is also mounted on the block 19e, the focal points $F_{2i}$, $F'_{2i}$, $F''_{2i}$ and $F'''_{2i}$ of these arrangements lying on a smaller circle (not numbered) intermediate the focal points $F_2$, $F'_2$, $F''_2$ and $F'''_2$. It will be evident that the apertures of the catoptric lens arrangements in each set may be chosen so that the secondary mirrors "overlap" to a degree. Therefore, optical energy to be focused may be directed into one or another of the individual catoptric lens arrangements from any direction. In other words, the individual ones of the second set of catoptric lens arrangements 12, 12a, 12b, 12c serves as "gap fillers." It will now be obvious that optical energy passing through the first set of catoptric lens arrangements 11, 11a, 11b, 11c will be focused at points $F_2$, $F'_2$, $F''_2$, $F'''_2$ on a first circle, centered at $F_c$, about the lens axis and that optical energy passing through the second set of catoptric lens arrangements 12, 12a, 12b, 12c will be focused at points $F_{2i}$, $F'_{2i}$, $F''_{2i}$ and $F'''_{2i}$ on a second circle about the lens axis. The center of the second circle may or may not be coincident with $F_c$.

The optical energy passing through the focal points $F_2$, $F'_2$, $F''_2$, $F'''_2$ is in four diverging beams which would intersect in two mutually orthogonal planes passing through the lens axis. Before reaching the lens axis, however, the beams are caused to fall on a hyperboloidal reflecting surface of a mirror 31a. Such reflecting surface is generated by rotating a portion of one branch of a hyperbola (not shown) about the lens axis. The focal points of the hyperbola are, respectively, $F_2$ and $F_c$. It is evident, therefore, that the diverging beams from $F_2$, $F'_2$, $F''_2$ and $F'''_2$ are thereby converted into diverging beams apparently originating at $F_c$. The diverging beams from the focal points $F_{2i}$, $F'_{2i}$, $F''_{2i}$ and $F'''_{2i}$ are caused to fall on the hyperboloidal reflecting surface of a mirror 31b. Such surface is generated by rotating a portion of a hyperbola (not shown) about the lens axis, the focal points of such hyperbola being $F_{2i}$ and $F_c$. It follows, then, that the diverging beams from $F_{2i}$, $F'_{2i}$, $F''_{2i}$ and $F'''_{2i}$ are converted to diverging beams apparently originating at $F_c$. The result, then, is that a single composite beam having a cross-section of the nature shown in FIG. 3A is formed. Such a beam, having an apparent origin at the focal point $F_c$, may then be collimated by a paraboloidal mirror in a conventional manner or focused by an ellipsoidal mirror (as mirror 33, FIG. 1).

All of the catoptric lens arrangements may be supported in a common mount 33 as shown in FIG. 3B. It follows then that, as in the embodiments shown in FIGS. 1 and 2, there is no aperture blockage in the arrangement shown in FIGS. 3B and C. It is noted, also, that, to combine a given number of laser beams, the size of the aperture of the individual catoptric lens arrangements is less than the size of the aperture required if a single lens arrangement is used.

It will now be evident that there is no requirement that the inner and outer lens arrangements be positioned at the same points along the lens axis. The only requirement is that the hyperboloidal reflecting surfaces of the mirrors 31a, 31b share the common focal point $F_c$. Further, it is not necessary that either the inner or outer lens arrangements have rotational axes parallel to the lens axis, again so long as the two sets of lens arrangements are oriented so that the hyperboloidal reflecting surfaces of the mirrors 31a, 31b share the common focal point $F_c$. It will also be evident that the shape of the reflecting surfaces of the entrance mirrors need not be parellipsoidal but may be generated by rotating portions of straight lines, parabolas or hyperbolas, depending upon the nature of the optical energy to be passed through the disclosed lens arrangement. Still further, it will be evident that the lens elements in the various illustrated embodiments need not be mounted on optically flat surfaces but rather may be mounted on adjustable mounts so that the desired physical relationships one to another may be attained. It is felt, therefore, that the invention should not be restricted to its disclosed embodiments, but rather should be limited only by the spirit and scope of the appended claims.

Additionally, it will be observed that the hyperboidal mirror 31 of FIG. 2 may be replaced by a wedge-shaped mirror, the inclination of the reflecting surfaces of such mirror with respect to the lens axis being such that the virtual origin of the diverging beams from focal points $F_2$ and $F'_2$ are at $F_c$; similarly, the zoned hyperboidal mirror (made up of mirrors 31a, 31b in FIG. 3C) may be replaced by faceted plane mirrors to the same end. Finally it will be observed that, as shown in FIGS. 3A and 3B, the mirrors in the individual confocal lens arrangements 11, 12 need not be halves of complete mirrors but rather may be any portion provided only that there is sufficient area not in the path of optical energy for the required support for each entrance mirror.

Figure 4A:
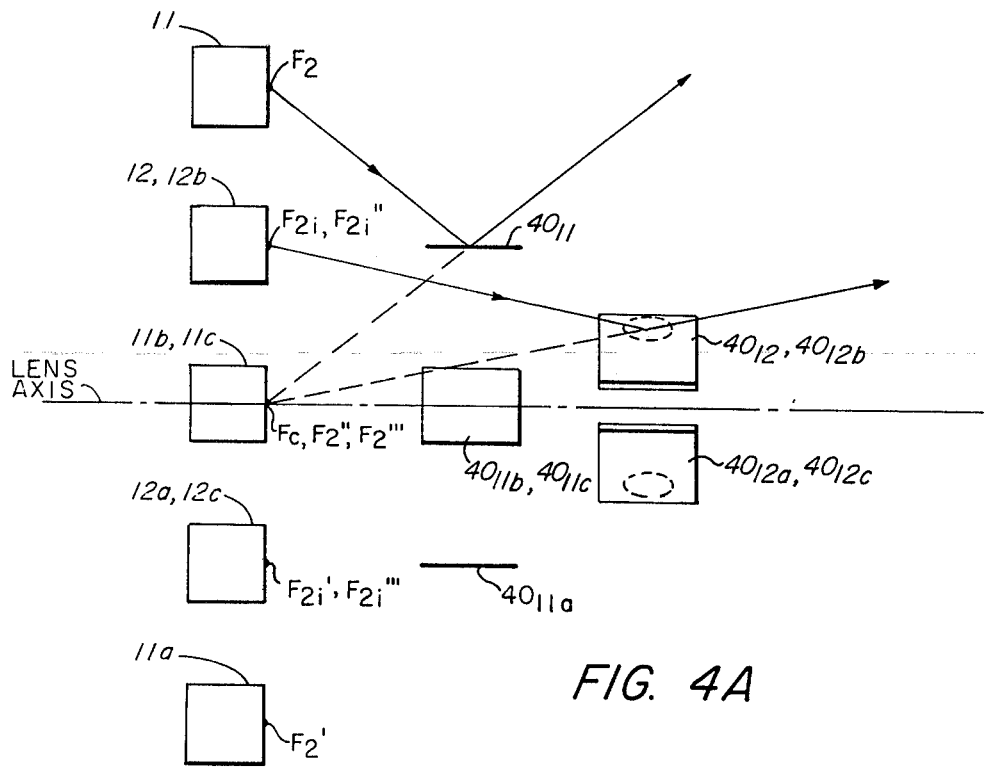
FIGS. 4A and 4B taken together are simplified sketches illustrating the manner in which planar mirrors may be substituted for the hyperboloidal mirror shown in FIG. 3C.
Figure 4B:
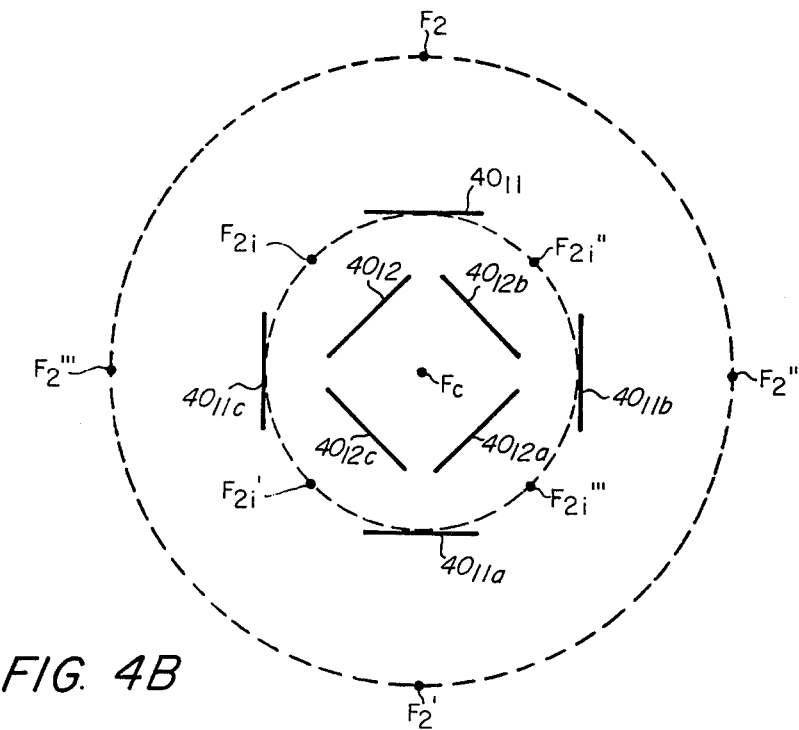

Referring now to FIGS. 4A and 4B, it may be seen that the assembly illustrated in either FIG. 2 or FIGS. 3A through 3C may be modified by substituting a proper number of planar mirrors for the hyperboloidal mirror 31 (FIG. 2) or the hyperboloidal mirrors 31a, 31b (FIGS. 3C). With each different one of such planar mirrors positioned and oriented to reflect the diverging beam out of a different one of the catoptric lens arrangements 11, 11a, 11b, 11c and 12, 12a, 12b, 12c, the apparent origins of all such diverging beams may, without any aberration, be shifted to the point $F_c$. Thus, in FIGS. 4A and 4B, planar mirrors $40_{11}$, $40_{11a}$, $40_{11b}$, $40_{11c}$ are shown to be disposed, respectively, along the perpendicular bisector of lines $F_2-F_c$, $F_2'-F_c$, $F_2''-F_c$ and $F_2'''-F_c$ to reflect the diverging beams from catoptric lens arrangements 11, 11a, 11b, 11c. Each one of the planar mirrors $40_{11}$, $40_{11a}$, $40_{11b}$, $40_{11c}$ is oriented so that the central ray in each diverging beam remains, after reflection in its meridional plane (meaning the plane defined by the lens axis and the focal points $F_2$, $F_2'$, $F_2''$, $F_2'''$. Similarly, planar mirrors $40_{12}$, $40_{12a}$, $40_{12b}$, $40_{12c}$ are here disposed to reflect, respectively, the diverging beams from focal points $F_{2i}$, $F_{2i}'$, $F_{2i}''$ and $F_{2i}'''$. The result then is that the diverging beams out of all of the catoptric lens assemblies 11, 11a, 11b, 11c and 12, 12a, 12b, 12c are redirected in such a manner that all of the rays in each one of such beams apparently originate at the focal point, $F_c$. Therefore, after reflection from the ellipsoidal mirror 33 (FIG. 2) for example, all of the rays in all of the diverging beams out of the catoptric lens arrangements 11, 11a, 11b, 11c and 12, 12a, 12b, 12c may be focused, without aberration, at a focal point $F_3$ (FIG. 2).

It will be apparent to one of skill in the art that orientation of the planar mirrors used to cause all diverging beams out of the various catoptric lens arrangements with respect to the lens axis may be changed provided that: (a) the central ray in each diverging beam remain, after reflection, in its meridional plane; and (b) the reflecting surface of each planar mirror bisect the angles defining each ray from the corresponding one of the focal points $F_2$, $F_2'$, $F_2''$, $F_2'''$ and $F_{2i}$, $F_{2i}'$, $F_{2i}''$, $F_{2i}'''$ and a line from each reflection point to the focal point, $F_c$. It will also be apparent to one of skill in the art that the disposition and number of the catoptric lens arrangements shown in FIGS. 2, 3A through 3C, 4A and 4B is not critical to the invention. As a matter of fact, if it is desired to eliminate the possibility that any energy, after passing the focal point $F_3$, be reflected back through any one of the catoptric lens arrangements in a reverse direction, such arrangements would not be arranged in diametrically opposing pairs.

What is claimed is:

1. In a catoptric arrangement for combining optical energy from a plurality of sources, the improvement comprising:
   a. at least a first and a second plurality of mirror assemblies disposed about a common axis, each one of such assemblies including a convex entrance mirror and a concave secondary mirror for focusing optical energy at a focal point; and
   b. common mounting means for all of the convex entrance mirrors and all of the concave secondary mirrors, such mounting means being formed to support the first plurality of mirror assemblies at a first distance from the common axis and to support the second plurality of mirror assemblies at a second distance from the lens axis.

2. The improvement as in claim 1 wherein the first and second distances are, respectively, the radii of a first and a second circle.

3. The improvement as in claim 2 having, additionally: a different planar mirror to reflect optical energy from each one of the first and the second plurality of mirror assemblies, each one of such planar mirrors being attached to the common mounting means in the path of the optical energy from a corresponding one of the mirror assemblies and having a reflecting surface to change the direction of the optical energy reflected therefrom so that the virtual origin of such reflected energy is a point on the common axis.

* * * * *